(12) United States Patent
Hoffmann et al.

(10) Patent No.: US 8,366,389 B2
(45) Date of Patent: Feb. 5, 2013

(54) METHODS AND APPARATUS FOR CONTROLLING WIND TURBINE THRUST

(75) Inventors: Till Hoffmann, Osnabrueck (DE); Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/100,466

(22) Filed: May 4, 2011

(65) Prior Publication Data

US 2012/0027586 A1    Feb. 2, 2012

(51) Int. Cl.
*F03D 7/04* (2006.01)
(52) U.S. Cl. ............... 416/1; 416/41; 416/61; 416/148
(58) Field of Classification Search .................. 415/4.3, 415/4.5, 908; 416/41, 43, 61, 147, 148, 244 R, 416/1

See application file for complete search history.

(56) References Cited

U.S. PATENT DOCUMENTS

| 4,083,651 A * | 4/1978 | Cheney et al. ............... 416/11 |
|---|---|---|
| 8,022,566 B2 * | 9/2011 | Loh et al. ............... 290/44 |
| 2004/0108729 A1 | 6/2004 | Wobben |
| 2009/0263245 A1 * | 10/2009 | Shi et al. ............... 416/43 |
| 2010/0063769 A1 * | 3/2010 | Egedal ............... 702/154 |
| 2010/0076614 A1 * | 3/2010 | Nies et al. ............... 700/287 |
| 2010/0133827 A1 * | 6/2010 | Huang et al. ............... 290/44 |
| 2010/0135791 A1 * | 6/2010 | Melius ............... 416/1 |

* cited by examiner

*Primary Examiner* — Edward Look
*Assistant Examiner* — Jason Davis
(74) *Attorney, Agent, or Firm* — Dority & Manning, P.A.

(57) ABSTRACT

A wind turbine and methods for controlling wind turbine thrust are disclosed. In one embodiment, the method includes measuring a tilt angle of a wind turbine in a loaded position using a measuring device. The wind turbine includes a tower, a nacelle mounted on the tower, a rotor coupled to the nacelle, and a plurality of rotor blades coupled to the rotor. The method further includes comparing the tilt angle to a predetermined tilt angle for the wind turbine and, if the tilt angle exceeds the predetermined tilt angle, adjusting a pitch of at least one of the plurality of rotor blades such that the tilt angle is less than or equal to the predetermined tilt angle.

12 Claims, 3 Drawing Sheets

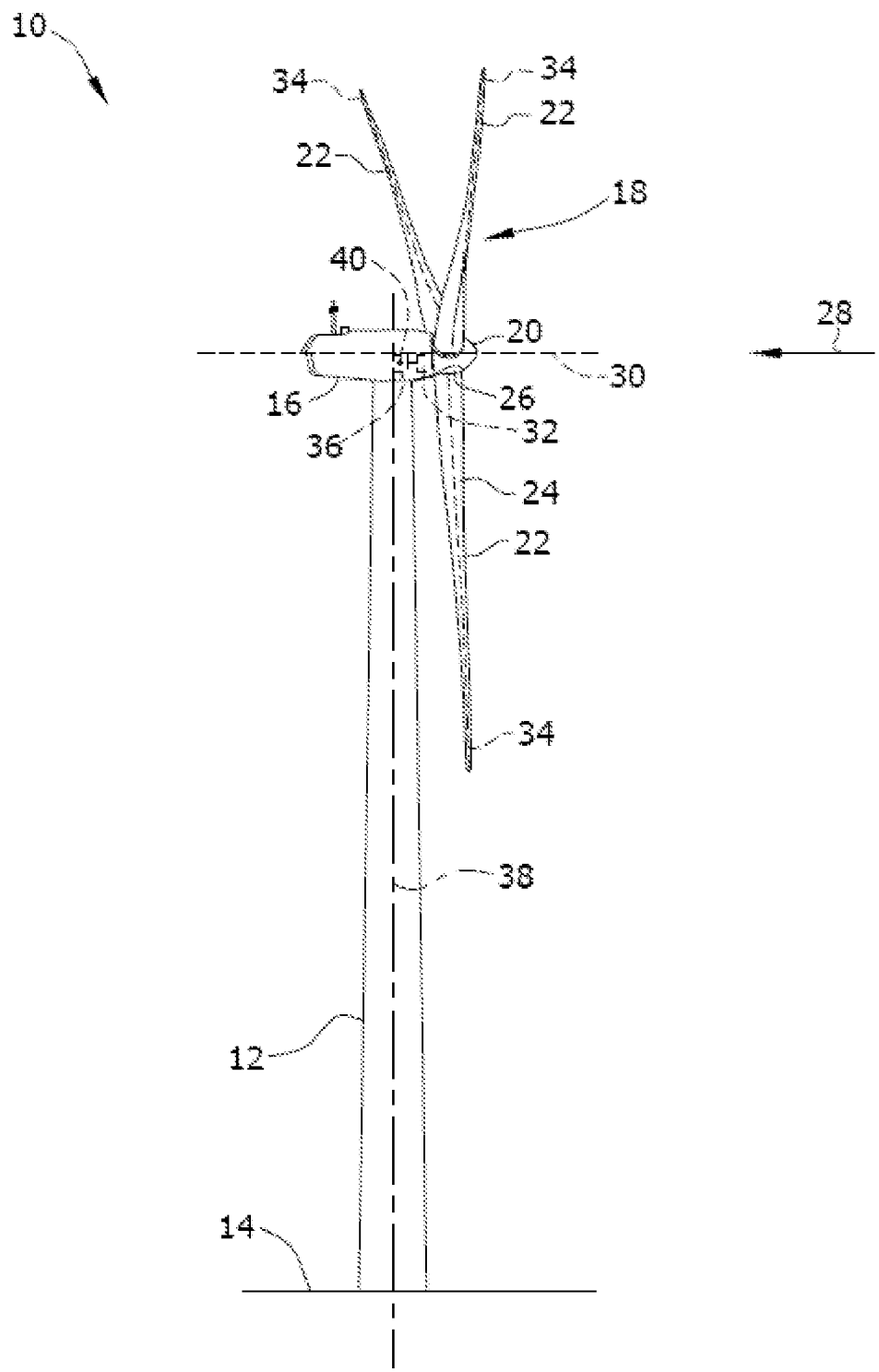
FIG. -1-

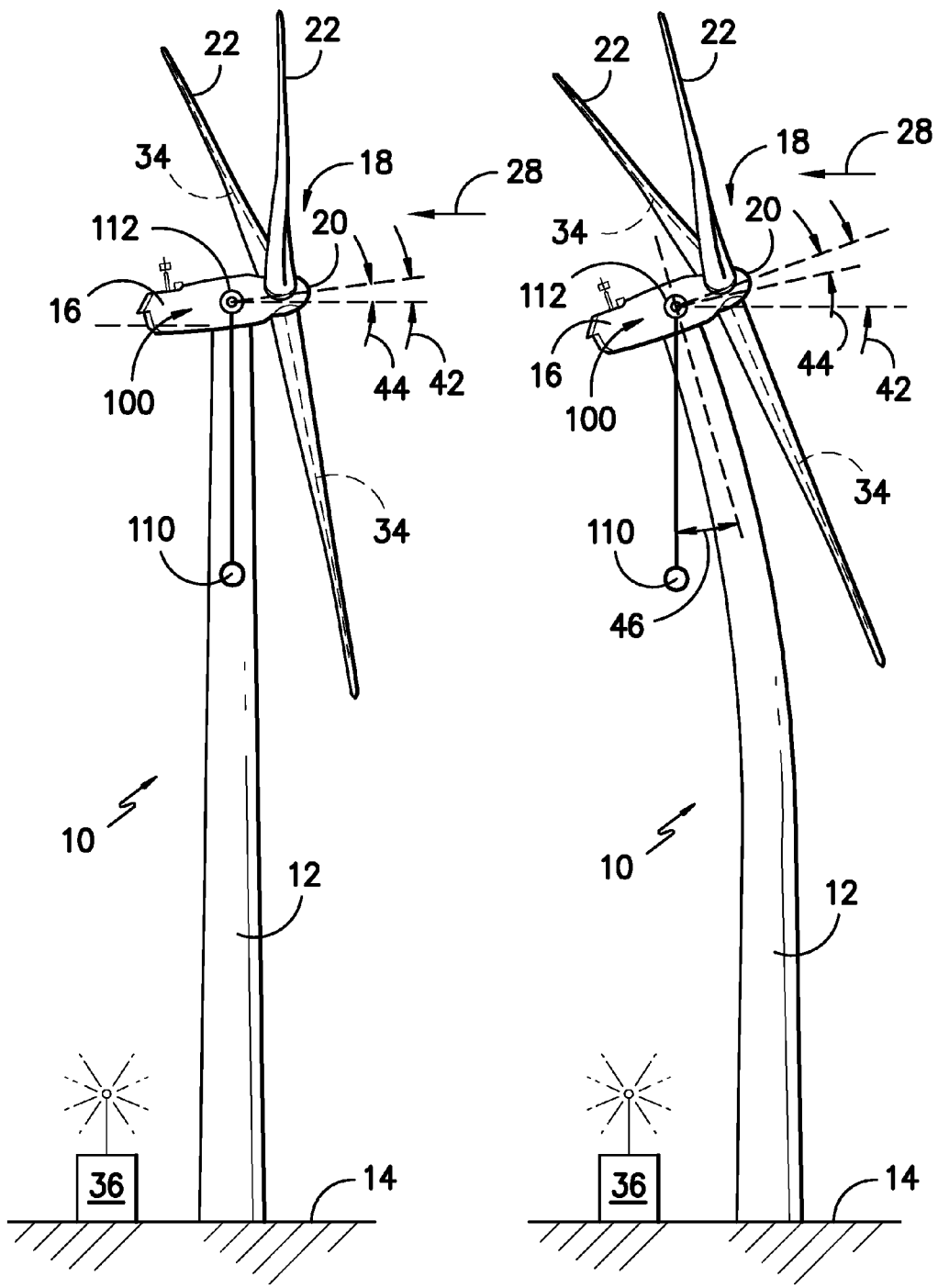
FIG. -2-    FIG. -3-

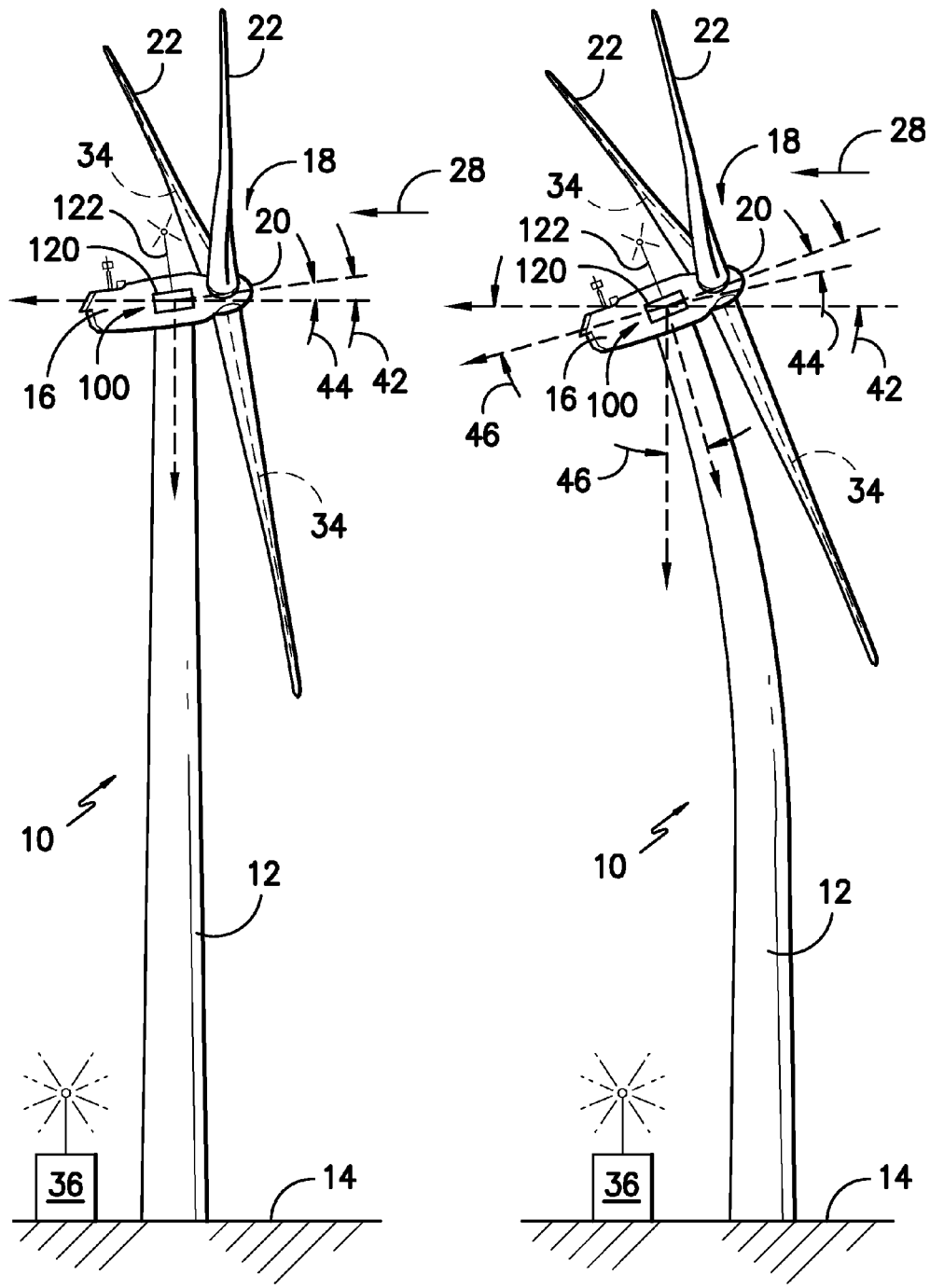
FIG. -4-   FIG. -5-

METHODS AND APPARATUS FOR CONTROLLING WIND TURBINE THRUST

FIELD OF THE INVENTION

The present disclosure relates in general to wind turbine, and more particularly to methods and apparatus for controlling the thrust on the wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation of a wind turbine, the wind turbine is subjected to thrust due to the interaction of wind with the rotor blades of the wind turbine. Excessive thrust may cause damage to the wind turbine. For example, thrust may cause the tower of the wind turbine to bend, causing fatigue loading of the structure. Excessive thrust may cause the tower to bend past a limiting point, causing failure of the tower and the wind turbine in general.

Known methods for controlling thrust in order to prevent damage or failure involve estimating the thrust by measuring the actual power produced by the wind turbine. This estimate of the thrust may be monitored, and if the estimated thrust reaches a predetermined peak value, the pitch of the rotor blades may be adjusted to reduce the estimated thrust. However, this thrust estimate may be influenced by various extraneous factors, such as variations in blade geometry, icing, fouling, and/or pitching errors, and may thus generally not be an accurate measurement of thrust.

Accordingly, an improved method and apparatus for controlling wind turbine thrust would be desired in the art. For example, a method and apparatus for more accurately controlling wind turbine thrust would be advantageous.

BRIEF DESCRIPTION OF THE INVENTION

Aspects and advantages of the invention will be set forth in part in the following description, or may be obvious from the description, or may be learned through practice of the invention.

In one embodiment, a method for controlling wind turbine thrust is disclosed. The method includes measuring a tilt angle of a wind turbine in a loaded position using a measuring device. The wind turbine includes a tower, a nacelle mounted on the tower, a rotor coupled to the nacelle, and a plurality of rotor blades coupled to the rotor. The method further includes comparing the tilt angle to a predetermined tilt angle for the wind turbine and, if the tilt angle exceeds the predetermined tilt angle, adjusting a pitch of at least one of the plurality of rotor blades such that the tilt angle is less than or equal to the predetermined tilt angle.

In another embodiment, a method for controlling wind turbine thrust is disclosed. The method includes receiving a signal in a control system, the signal corresponding to a tilt angle of a wind turbine in a loaded position. The wind turbine includes a tower, a nacelle mounted on the tower, a rotor coupled to the nacelle, and a plurality of rotor blades coupled to the rotor. The method further includes utilizing the signal to electronically compare the tilt angle to a predetermined tilt angle for the wind turbine and, if the tilt angle exceeds the predetermined tilt angle, electronically adjusting a pitch of at least one of the plurality of rotor blades such that the tilt angle is less than or equal to the predetermined tilt angle.

In another embodiment, a wind turbine is disclosed. The wind turbine includes a tower, a nacelle mounted on the tower, a rotor coupled to the nacelle, and a plurality of rotor blades coupled to the rotor. The wind turbine additionally includes a measuring device configured to measure a tilt angle of the wind turbine in a loaded position. The wind turbine further includes a control system in communication with the measuring device, the control system configured to compare the tilt angle to a predetermined tilt angle for the wind turbine and, if the tilt angle exceeds the predetermined tilt angle, adjust a pitch of at least one of the plurality of rotor blades such that the tilt angle is less than or equal to the predetermined tilt angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is a perspective view of a wind turbine including a measuring device and control system and in an unloaded position according to one embodiment of the present disclosure;

FIG. 3 is a perspective view of a wind turbine including a measuring device and control system and in a loaded position according to one embodiment of the present disclosure;

FIG. 4 is a perspective view of a wind turbine including a measuring device and control system and in an unloaded position according to another embodiment of the present disclosure; and, FIG. 5 is a perspective view of a wind turbine including a measuring device and control system and in a loaded position according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36, which may include pitch adjustment system 32. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In this exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

As shown in FIGS. 2 through 5, a tilt angle 42 may additionally be defined for the wind turbine 10. The tilt angle 42 may generally be the angle between the wind direction 28 (presumed for purposes of defining the tilt angle 42 to be approximately horizontal) and axis 30 of the rotor 18. The tilt angle 42 for a wind turbine 10 may include two or more tilt angle components. For example, a first angle 44 may be defined for the wind turbine 10. This first angle 44 may be defined for the wind turbine 10 in an unloaded position, as shown in FIGS. 2 and 4, and/or in a loaded position, as shown in FIGS. 3 and 5. This first angle 44 is the standard or characteristic tilt angle of the rotor 18 or machine head, and may be controlled by the control system 36. Thus, before, during, or after operation of the wind turbine 10, adjustments to the first angle 44 may be made by the control system 36 as desired or required. Typically, the first angle 44 is approximately 4°, or in the range between 0° and approximately 4°. However, it should be understood that the present disclosure is not limited to the above disclosed first angles 44, and rather that any suitable first angle 44 or range of first angles 44 is within the scope and spirit of the present disclosure.

Further, a second angle 46 may be defined for the wind turbine 10. This second angle 46 may be defined for the wind turbine 10 in the loaded position, as shown in FIGS. 3 and 5. The second angle 46 is the tilt angle of the rotor 18 due to thrust on the wind turbine 10 during operation of the wind turbine 10. For example, during operation, the interaction of the wind with the rotor blades 22 may generate thrust. Various components of the wind turbine 10, such as the tower 12, may bend in response to this thrust into a loaded position, as shown in FIGS. 3 and 5. This loaded position may constantly vary during operation of the wind turbine 10 due to variations in the amount of thrust generated, which in turn may vary due to variations in wind speed, pitch of the rotor blades 22, and other various factors. Angle 46 may thus be defined between the position of the rotor 18 in the unloaded position and the position of the rotor 18 in a loaded position.

During operation of the wind turbine 10, it may be desirable to accurately control the amount of thrust on the wind turbine 10. Accurate thrust control may allow the wind turbine 10 to have maximal power production while ensuring that the tilt angle 42 of the wind turbine 10 does not exceed a predetermined tilt angle for the wind turbine 10.

As discussed, the tilt angle 42 may in exemplary embodiment be defined as the sum of the first angle 44 and the second angle 46. The predetermined tilt angle, in exemplary embodiments, may be a maximum tilt angle. Thus, in these embodiments, the predetermined tilt angle may be the sum of the first angle 44 and the maximum second angle 46 that the wind turbine 10 can endure in a loaded position. This maximum second angle 46 may be determined as a maximum angle before damage or failure of, for example, the tower 12 or another component of the wind turbine 10, and/or may include a factor of safety. For example, the maximum second angle 46 may, in some embodiments, be approximately 5°, or in the range between 0° and approximately 5°. However, it should be understood that the present disclosure is not limited to the above disclosed maximum second angles 46, and rather that any suitable maximum second angle 46 or range of second angles 46 is within the scope and spirit of the present disclosure. Further, in alternative embodiments, the predetermined tilt angle may be the sum of the first angle 44 and any suitable second angle 46, as desired or required.

Thus, the present disclosure is directed to a method for controlling wind turbine 10 thrust. In some exemplary embodiments, for example, the present method may include the step of measuring the tilt angle 42 of the wind turbine 10 in a loaded position using a measuring device 100. Measuring the tilt angle 42 in a loaded position may include measuring the sum of the first angle 44 and the second angle 46, measuring the first angle 44 and the second angle 46 and then adding them together, or just measuring the second angle 46.

In some embodiments, the method may further comprise the step of measuring the tilt angle 42 of the wind turbine 10 in a reference position and calibrating the measuring device 100. The reference position may be the unloaded position or any other suitable calibration position for the wind turbine 10. Measuring the tilt angle 42 in an unloaded position may include, for example, measuring the first angle 44. Calibrating the measuring device 100 may include, for example, calibrating the measuring device based on the first angle 44 such that the first angle 44 is taken into account when measuring the tilt angle 42 of the wind turbine 10 in a loaded position.

The measuring device 100 may be any device suitable for measuring the various angles of the wind turbine 10 in loaded and unloaded positions. For example, in one embodiment, as shown in FIGS. 2 and 3, the measuring device 100 may include a pendulum 110. As shown in FIGS. 2 and 3, the pendulum 110 hangs generally vertically whether the wind turbine 10 is in an unloaded position or a loaded position. Thus, when the wind turbine 10 moves between an unloaded position and a loaded position, the rotor 18 and nacelle 16 may pivot or bend, and the pendulum may swing as required to remain in a generally vertical position. Second angle 46 may thus be measured between the position of the pendulum 110 and rotor 18 or nacelle 16 with respect to each other in the unloaded position (FIG. 2) and the position of the pendulum 110 and rotor 18 or nacelle 16 with respect to each other in the loaded position (FIG. 3), or may be measured based on the movement of the pendulum to remain in a generally vertical position when the wind turbine 10 moves between an unloaded position and a loaded position.

In some exemplary embodiments, the measuring device 100 may further comprise an electronic sensor 112 coupled to the pendulum 110. The electronic sensor 112 may electronically measure the movement and/or positioning of the pendulum 110 to measure the second angle 46, as discussed above, and may further electronically report this information through a signal to control system 36, as discussed below. It should be understood that the sensor 112 may be a component of the pendulum 110 or may be included in addition to the pendulum 110.

Additionally or alternatively, the measuring device 100 may include an accelerometer 120. As shown in FIGS. 4 and 5, the accelerometer 120 may generally measure acceleration along, for example, an X-axis and a Y-axis. Thus, when the wind turbine 10 moves between an unloaded position and a loaded position, the rotor 18 and nacelle 16 may pivot or bend, and the accelerometer may register a change in the acceleration along the X-axis and/or the Y-axis. The second angle 46 may be calculated from this change in acceleration utilizing known dynamic principles.

In some exemplary embodiments, the measuring device 100 may further comprise an electronic sensor 122 coupled to the accelerometer 120. The electronic sensor 122 may electronically measure the changes in acceleration registered by the accelerometer 120 to measure the second angle 46, as discussed above, and may further electronically report this information through a signal to control system 36, as discussed below. It should be understood that the sensor 122 may be a component of the accelerometer 120 or may be included in addition to the accelerometer 120.

As mentioned above, in exemplary embodiments, the measuring device 100 may be attached to the nacelle 16 or rotor 18. Thus, the tilt angle 42 may be measured in these embodiments at the nacelle 16 or the rotor 18. It should be understood, however, that the present disclosure is not limited to the above positioning of the measuring device 100, and rather that any suitable positioning of the measuring device on the wind turbine 10 or separate from the wind turbine 10 is within the scope and spirit of the present disclosure.

In some embodiments, the present method may include receiving a signal in the control system 36. The signal may correspond to the tilt angle 42 of the wind turbine 10 in the loaded position. The signal may, in exemplary embodiments, be received from a measuring device 100, as discussed above. Thus, the measuring device 100 in these embodiments may measure tilt angle 42 and electronically transmit the tilt angle 42 to the control system 36. Alternatively, any suitable device or apparatus may be utilized to transmit a signal corresponding to the tilt angle 42 to the control system 36.

The present method may further include the step of comparing the tilt angle 42 measured in the loaded position to a predetermined tilt angle for the wind turbine 10. As discussed above, the tilt angle 42 and predetermined tilt angle may each include the sum of the first angle 42 and the second angle 46, or may be calibrated or determined to include just the second angle 46. In exemplary embodiments, the tilt angle 42 may be electronically compared to the predetermined tilt angle, such as in control system 36.

The present method may further include, if the tilt angle 42 exceeds the predetermined tilt angle, adjusting a pitch of at least one of the plurality of rotor blades 22. Further the pitch of more than one of the plurality of rotor blades 22, such as each of the plurality of rotor blades 22, may be adjusted if desired or required. The pitch of the one or more rotor blades 22 may be adjusted such that the tilt angle 42 is less than or equal to the predetermined tilt angle. For example, adjusting the pitch may reduce the thrust on the wind turbine 10, thus reducing the tilt angle 42 in the loaded position. The pitch may thus be adjusted as desired or required such that the tilt angle 42 is less than or equal to the predetermined tilt angle. In exemplary embodiments, the pitch may be electronically adjusted, such as by control system 36.

In exemplary embodiments, the various steps of the present method may be repeatedly performed in a closed loop system before, during, and/or after operation of a wind turbine 10. Thus, the present method may provide constant monitoring of the tilt angle 42, which may thus constantly control the amount of thrust on the wind turbine 10 and prevent damage therefrom. Alternatively, the various steps of the present method may be performed to provide, for example, one-time monitoring of the tilt angle 42 to control the amount of thrust as, for example, a safety check for the wind turbine 10. Further, it should be understood that the various steps of the present method may be performed in any suitable fashion as required or desired to control wind turbine thrust.

The present disclosure is further directed to a wind turbine 10. The wind turbine 10 may include components configured to control thrust. For example, the wind turbine 10 may include a tower 10, nacelle 16, rotor 18, and plurality of rotor blades 22, as discussed above. Additionally, the wind turbine 10 may include a measuring device 100. The measuring device 100 may be configured to measure a tilt angle 42 of the wind turbine 10 in a loaded and an unloaded position, as discussed above. Further, the wind turbine 10 may include a control system 36. The control system 36 may be in communication with the measuring device 100. Additionally, the control system 36 may be configured to compare the tilt angle 42 to a predetermined tilt angle for the wind turbine 10. Further, if the tilt angle 42 exceeds the predetermined tilt angle, the control system 36 may be configured to adjust a pitch of at least one of a plurality of rotor blades 22 such that the tilt angle 42 is less than or equal to the predetermined tilt angle, as discussed above.

In exemplary embodiments, the measuring device 100 and control system 36 may operate as described above repeatedly in a closed loop system before, during, and/or after operation of a wind turbine 10. Thus, the present wind turbine 10 may provide constant monitoring of the tilt angle 42, which may thus constantly control the amount of thrust on the wind turbine 10 and prevent damage therefrom. Alternatively, the measuring device 100 and control system 36 may operate as described above to provide, for example, one-time monitoring of the tilt angle 42 to control the amount of thrust as, for example, a safety check for the wind turbine 10. Further, it should be understood that the various steps of the present method may be performed in any suitable fashion as required or desired to control wind turbine thrust.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling wind turbine thrust, the method comprising:
    measuring a tilt angle of a wind turbine in a loaded position using a measuring device, the wind turbine comprising a tower, a nacelle mounted on the tower, a rotor coupled to the nacelle, and a plurality of rotor blades coupled to the rotor, the measuring device comprising an accelerometer;
    comparing the tilt angle to a predetermined tilt angle for the wind turbine; and,
    if the tilt angle exceeds the predetermined tilt angle, adjusting a pitch of at least one of the plurality of rotor blades such that the tilt angle is less than or equal to the predetermined tilt angle.

2. The method of claim 1, further comprising measuring the tilt angle of the wind turbine in a reference position and calibrating the measuring device.

3. The method of claim 1, further comprising adjusting a pitch of each of the plurality of rotor blades such that the tilt angle is less than or equal to the predetermined tilt angle.

4. The method of claim 1, wherein the pitch is adjusted electronically.

5. The method of claim 1, further comprising transmitting the tilt angle to a control system, and wherein the tilt angle is electronically compared to the predetermined tilt angle.

6. The method of claim 1, wherein the tilt angle is measured at the nacelle.

7. The method of claim 1, wherein the measuring device further comprises an electronic sensor coupled to the accelerometer.

8. A method for controlling wind turbine thrust, the method comprising:
    receiving a signal in a control system from a measuring device configured to measure a tilt angle of a wind turbine, the signal corresponding to the tilt angle of the wind turbine in a loaded position, the wind turbine comprising a tower, a nacelle mounted on the tower, a rotor coupled to the nacelle, and a plurality of rotor blades coupled to the rotor, the measuring device comprising an accelerometer;
    utilizing the signal to electronically compare the tilt angle to a predetermined tilt angle for the wind turbine; and,
    if the tilt angle exceeds the predetermined tilt angle, electronically adjusting a pitch of at least one of the plurality of rotor blades such that the tilt angle is less than or equal to the predetermined tilt angle.

9. The method of claim 8, further comprising electronically adjusting a pitch of each of the plurality of rotor blades such that the tilt angle is less than or equal to the predetermined tilt angle.

10. The method of claim 8, further comprising measuring the tilt angle of the wind turbine in a reference position and calibrating the measuring device.

11. The method of claim 8, wherein the tilt angle is measured at the nacelle.

12. A wind turbine, comprising:
    a tower;
    a nacelle mounted on the tower;
    a rotor coupled to the nacelle;
    a plurality of rotor blades coupled to the rotor;
    a measuring device configured to measure a tilt angle of the wind turbine in a loaded position, the measuring device comprising an accelerometer; and,
    a control system in communication with the measuring device, the control system configured to compare the tilt angle to a predetermined tilt angle for the wind turbine and, if the tilt angle exceeds the predetermined tilt angle, adjust a pitch of at least one of the plurality of rotor blades such that the tilt angle is less than or equal to the predetermined tilt angle.

* * * * *